Patented Feb. 6, 1923.

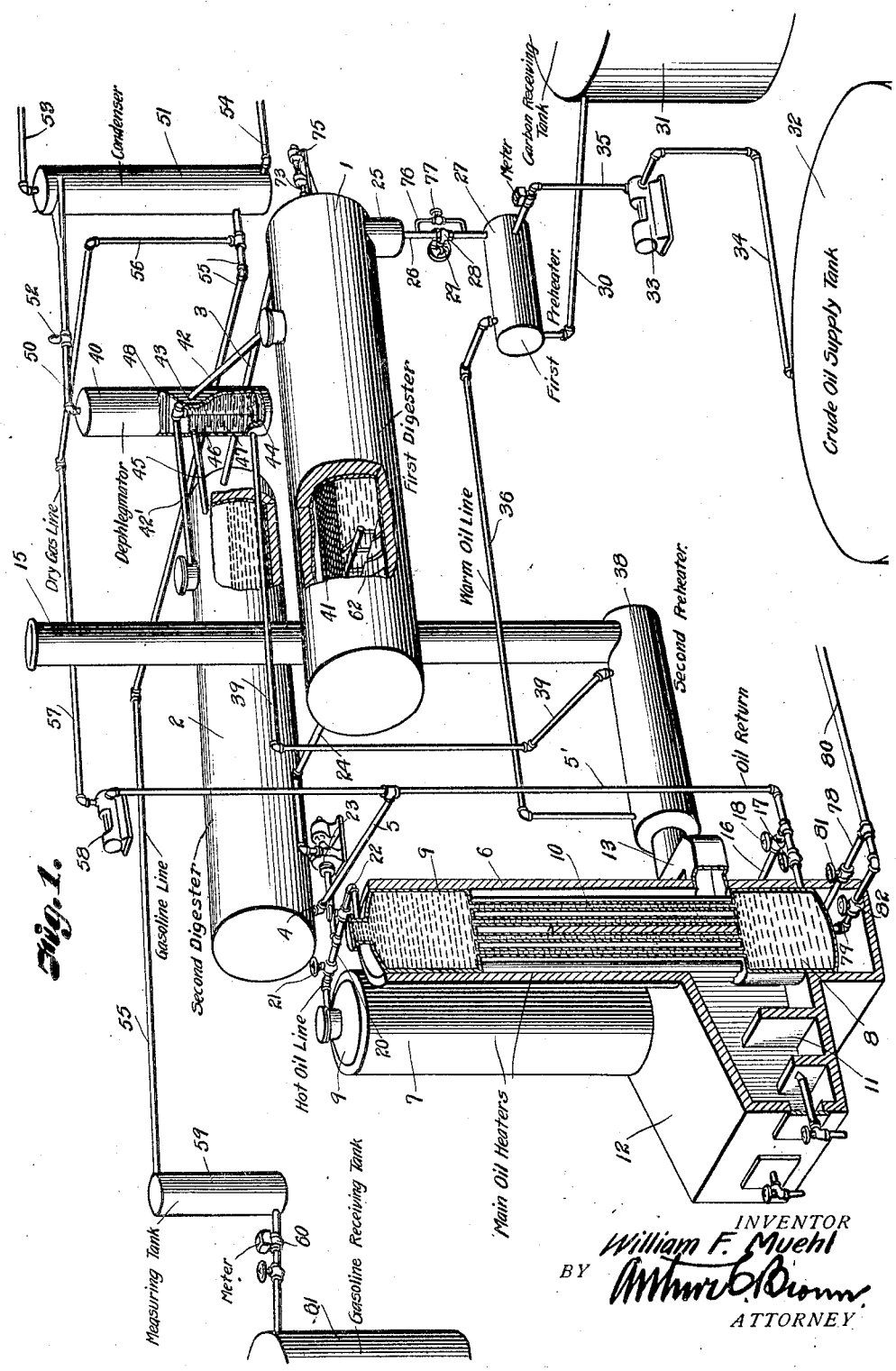

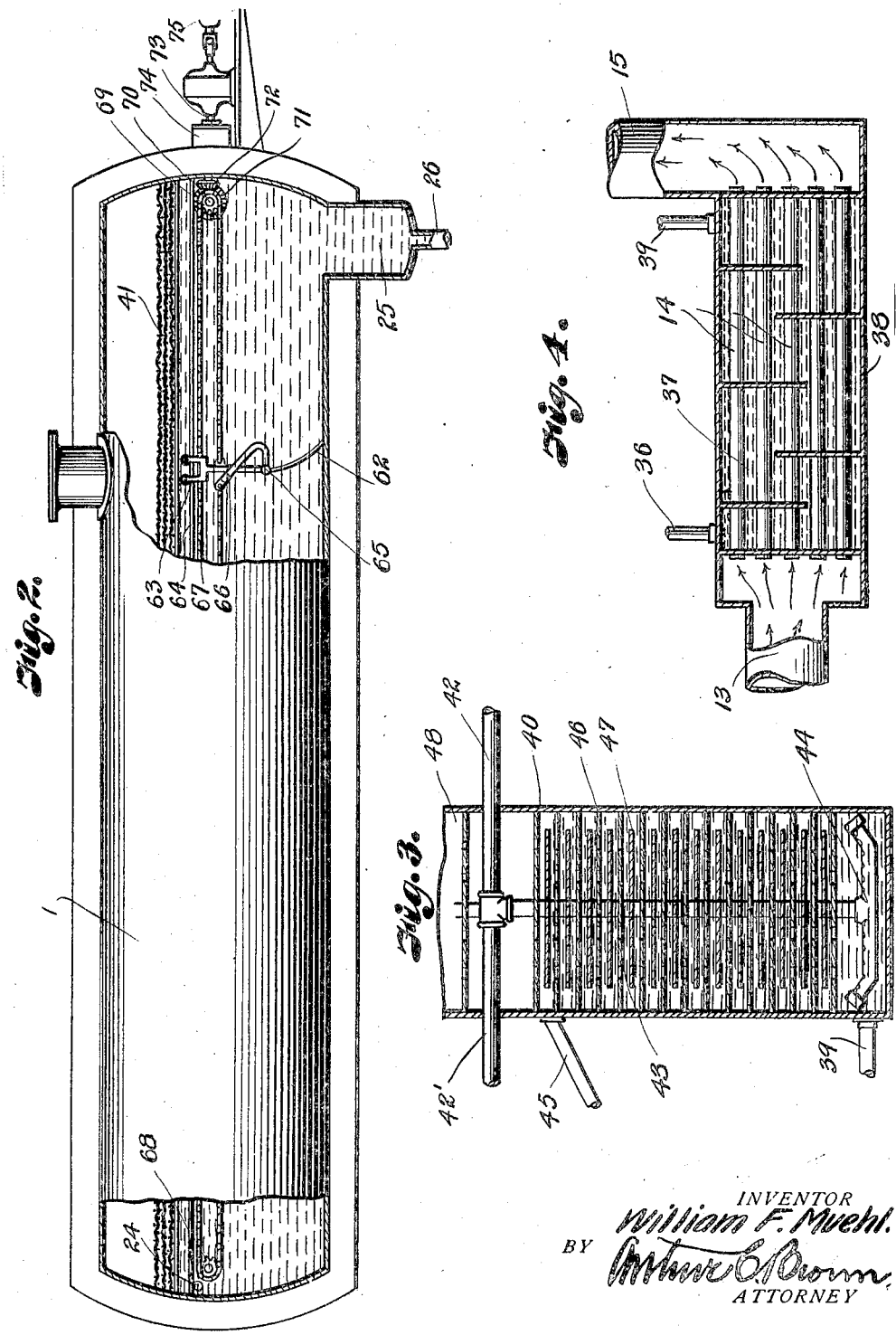

1,444,128

UNITED STATES PATENT OFFICE.

WILLIAM F. MUEHL, OF KANSAS CITY, MISSOURI.

APPARATUS FOR CONVERTING HYDROCARBON OILS.

Application filed August 17, 1922. Serial No. 582,495.

*To all whom it may concern:*

Be it known that I, WILLIAM F. MUEHL, a citizen of the United States, residing at Kansas City, in the county of Jackson and State of Missouri, have invented certain new and useful Improvements in Apparatus for Converting Hydrocarbon Oils; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an apparatus for converting hydrocarbon oils having a high boiling point into hydrocarbon oils having a lower boiling point and this application is a continuation in part of an application filed by me on or about June 15, 1922, Serial No. 568,493.

The primary object of the invention is to provide a mechanism for improving the process for converting the heavier hydrocarbon oils into lighter hydrocarbon oils to provide a product commercially known as "gasoline" and another very important object of the invention is to provide means by which the process can be carried on continuously without shutting down the plant for cleaning, inspection or repairs, it being one of the features of the invention that the bulk of the oil under treatment will maintain its temperature and pressure for a considerable period even after the plant has shut down.

It is further of prime importance that an efficient workable means be provided for removing accumulated carbon from the digester still into which the oil is introduced at a cracking temperature from the primary heater because by such an arrangement the digester can be kept clear of carbon and thereby allow a continuous operation of the plant.

In all cracking plants of which I have knowledge the operations are intermittent, due to the fact that frequent shutdowns must occur for the purpose of cleaning out the carbon in the digesters. These shutdowns are of frequent occurrence and obviously when a plant is shut down for cleaning out carbon, the oil must be drawn off and the plant must be allowed to cool with the resultant loss of time and fuel in the operation of the plant. The cooling and cleaning operation extends over a considerable period of time so that before the plant can be started up again, additional time is lost and considerable fuel is consumed in bringing the oil to the proper cracking temperature.

My invention contemplates the provision of means whereby the plant can be operated continuously over a considerable period of time in contra-distinction to the intermittent operation of all plants of which I have any knowledge. The continuous operation is accomplished by providing certain heaters which heat the liquid to the decomposing temperature, these heaters being arranged so that one may be cut out while the other is operated, or vice versa, and in order to assist in the accomplishment of the desired result I provide a primary cracking or vapor chamber, sometimes called a digester, into which the heated oil is fed, losing its velocity due to the capacity of the chamber, so that the cracking or reaction can take place while the oil is practically quiescent, the advantage being that the buoyancy of the oil or its ability to support carbon in suspension is reduced to a minimum and the carbon is permitted to gravitate to the bottom of the zone or digester from which it can be removed without interference with the continuous use of the vapor chamber in the operation of the plant.

This is of great importance because all plants of which I have knowledge must essentially be intermittent in their operations because no means has been provided to remove the carbon at the proper point in the system so that the reactions may continue while the carbon is being removed.

In carrying out my invention the oil is first introduced into one of the digesters or vaporizing chambers to provide a relatively large volume. The oil may feed from it into primary heaters or tubular furnaces, at which point its temperature will be raised to a cracking temperature. The oil passes in ascending streams through vertical tubes in the primary heaters or furnaces at a relatively rapid rate sufficient to prevent deposition of carbon upon the inner surfaces of the tubes and from there it is passed into a relatively large chamber or digester where the oil accumulates in a relatively large volume. For example, the oil passes through the primary heaters at a decomposing temperature at a speed of about 16 to 20 feet per minute and discharges into the first digester or vaporizing chamber at that temperature, where its velocity will have an appreciable drop, the primary digester or chamber being relatively long in comparison to its diameter and the large volume of oil contained in the chamber causes the incoming oil from the primary heater to be practically dormant as to speed or movement to permit sufficient time for decomposition to take place. The gases disengage themselves from the oil in this chamber and since the oil loses its buoyancy due to the slowing-up of its speed, there is a deposition of carbon in the first digester or chamber. The oil preferably enters the digester at one end and the vapor passes out at the other. The discharge end of the first digester or chamber is connected to a second digester or chamber of substantially like dimensions and in the same horizontal plane for the purpose of maintaining the level in both chambers constant.

Immediately below the outlet of the first digester or chamber is a screen co-extensive with the cross section of the digester at that point, the screen being provided for the purpose of further facilitating the deposition of the carbon therein. When the carbon is deposited on the bottom of the first digester, it may be intermittently scraped or forced to a sump provided to receive it, the sump being in the form of a pit in the bottom of the first digester. An appropriate means is provided for either intermittently or continuously allowing the carbon to be removed from the bottom of the first still or cracking chamber without interfering with the proper decomposition of the oil within it.

I have provided means whereby the vapor or lighter hydrocarbons thrown off by the heated oil in the first digester or chamber may be discharged into a dephlegmator in which it may pass up through a body of preheated oil at a temperature less than the decomposition temperature. the vapors being released at the bottom of the dephlegmator to pass through the oil therein and cause the vapors which are not condensed at the temperature contained in the dephlegmator to pass into the condenser at atmospheric pressure and when condensed, they are removed from the top of the condenser while the non-condensible gases are withdrawn at the bottom of the condenser and returned to the primary heaters or furnaces.

The level of the preheated oil within the dephlegmator is maintained constant by overflowing into the second digester above mentioned, where additional disengagement of the vapors in the oil is accomplished, it being intended that the oil overflowing from the first digester directly into the second digester will also permit disengagement of certain vapors adapted to pass back into the dephlegmator to combine with those lighter ends which have been fed into the dephlegmator from the first digester and with them pass into the condenser.

I have provided means whereby one of the primary heaters or furnaces may be cut off without disturbing the operation of the other heater. The circuit thereby may be continuously maintained, the pressure all the while being maintained constant throughout the apparatus except in the condenser and the temperature in the second digester is all the while maintained approximately constant so that the system will be operating at approximately the same temperatures and pressures throughout; there being, of course, a slight variation in temperatures in the various parts of the system due to natural causes but it is important in my invention that the temperatures be maintained as nearly constant throughout as is practical in a system of this kind.

While the drop in temperature in the system will be slight, it will be such as to cause the oil returning from the digester 2 to the heaters to enter the heaters below that which will permit cracking but the heaters will raise the oil to a cracking temperature before it enters the digester 1.

The details of construction of the invention as well as the novel results obtained will be apparent by reference to the following description in connection with the drawings, in which Fig. 1 is a perspective diagrammatic view of the complete system, certain parts being shown in section to better illustrate their construction.

Fig. 2 is an enlarged, longitudinal view of the primary digester or vaporizing chamber shown partly in elevation and partly in section.

Fig. 3 is a fragmentary, vertical, sectional view through the dephlegmator, and

Fig. 4 is a vertical, longitudinal, sectional view through one of the preheaters.

Referring now to the drawings by numerals of reference:

1 designates a digester or tank of appropriate dimensions, considerably longer than its diameter, and 2 is a complementary or secondary digester, which is connected directly with the digester 1 through the pipe 3 so that there will be corresponding liquid levels in the two digesters. The digester 2 has an outlet 4 at the end opposite to that at which the pipe 3 connects it to the digester 1. The outlet 4 discharges into a pipe 5 which, in turn, empties into the primary heaters or furnaces for raising the oil to the decomposing temperatures.

The oil is first introduced into the still 2 through any suitable means in order to provide the necessary volume to feed the primary heaters designated 6 and 7. After the requisite amount of oil is supplied, the digester 2 becomes a secondary digester as will be apparent hereinafter.

The heaters 6 and 7 are each provided with a lower header 8 and an upper header 9 connected by vertical tubes or pipes 10 and said tubes may be heated by the products of combustion from the fire box or fire boxes 11 of the furnace structure 12. The flames may pass around the tubes 10 and out through a flue 13 through the horizontal tubes 14 of a preheater and thence to the stack 15 (see Figs. 1 and 4).

The pipe 5 connects directly into the header 8 of the heater 6 and a branch pipe 16 communicates the pipes 5 5' with the header 8 (the lower header not shown) of the heater 7. Therefore, the oil can pass from the pipe 5 through pipe 5' directly into the header 8 of the heater 6 provided the valve 17 is cracked. If the valve 18 in the branch pipe 16 communicating with pipe 5' is cracked, the oil may pass into the lower header in the heater 7. If the valve 17 is closed, the heater 6 will be cut out of the system and if the valve 18 is closed, the heater 7 will be cut out of the system.

Assuming that both heaters 6 and 7 are operating, the oil will have its temperature raised in the lower headers 8 so that it will pass at a rapid rate through the tubes 10, the hot oil accumulating in the upper headers 9 and discharging into the pipe 20 having valves 21 and 22, one for each heater. The pipe 20 discharges into a circulating pump 23, which controls the velocity of the oil discharged from it into the inlet 24 of the primary digester 1. As the oil passes through the tubes 10, its velocity will be enough to prevent or at least reduce the liability of accumulation of carbon. Its velocity will be materially reduced when it enters the primary digester 1 because there will be a relatively small stream feeding into a relatively large volume of oil in the digester 1. Therefore, the oil will pass into the digester 1, its velocity being reduced and its buoyancy impaired. Therefore, the carbon contained in the incoming oil will be allowed to gravitate to the bottom of the digester 1, from which it may be scraped into a pit or sump 25 at the discharge end of the digester 1.

The bottom of the sump communicates with a pipe 26 connected to one end of an oil preheater 27 and in the pipe 26 is a valve 28, provided with a relatively large hand wheel 29 much like a fly wheel so that the operator can easily turn the valve to spin it so as to momentarily open the pipe 26 to allow the pressure in the tank or digester 1 to blow the accumulated carbon from the sump through the preheater into the pipe 30, which communicates with the accumulating tank 31 adapted to receive the asphaltum, carbon or other solids deposited in the sump.

The preheater 27 may be of any appropriate construction, for example, a tube may be provided in it with which the pipes 26 and 30 communicate. The oil from the supply tank 32 may be fed through the preheater in any appropriate manner so that there will be a heat exchange and the cold oil will absorb the heat generated in the preheater by passing the carbon and other deposits through it.

The oil is pumped from the tank 32 by a pump 33, which communicates with the tank 32 through a pipe 34 and which communicates with the preheater 27 through a pipe 35.

After the oil passes through the preheater 27, it will pass out through pipe 36 through the space 37 in the preheater 38 in which the tubes 14 are provided and thence through the pipe 39 to the bottom of the dephlegmator 40, where it will be fed at a rate sufficient to replenish the vaporized oil which has passed off through the dephlegmator during the operation of the plant.

It should be remembered, however, that in initially starting up the plant, enough oil is supplied to the secondary digester or tank 2 to provide the requisite capacity of oil in the digesters 1 and 2. In other words, the plant may be initially primed by introducing sufficient oil through the tank or digester 2 to allow the oil to pass to the heaters and into the digesters 1 and 2 until the oil reaches the proper level in said digesters. The proper level in the digester 1 will be immediately below the screen 41, which is co-extensive with the proposed level of the oil therein. The screen will be described in detail hereinafter.

Attention is called to the fact that the vapor outlet for the digester 1 is shown as consisting of a pipe 42 which discharges into the dephlegmator 40 and flows through a pipe 43 which discharges into a spider 44 in the bottom of the dephlegmator 40. The oil from 39 will maintain the level of the incoming oil in the dephlegmator 40 about midway the height of the dephlegmator casing because its flow-off is through pipe 45 which has its inlet above its discharge into the tank or digester 2. Therefore, the pipe 45 serves as an overflow pipe from the dephlegmator and the level of the oil in the dephlegmator cannot rise above the inlet end of the pipe 45.

The dephlegmator is provided with a plurality of baffles. There are two sets, designated 46 and 47. Those designated 46 are co-extensive with the cross section of the dephlegmator but they are perforated. Those designated 47 are of less diameter than the dephlegmator and they alternate with those designated 46 so that a tortuous passage is provided to cause a tortuous flow of the lighter ends of the hydrocarbons which have escaped from the spider 44.

The dephlegmator has a vapor space 48 above the liquid and this space is also provided with baffles so that it will tend to condense whatever ends heavier than those of the gasoline group which may be contained therein so that the escaping vapors from the dephlegmator will be the very light ends, such as will produce a high grade of gasoline.

From the vapor space 48 of the dephlegmator the vapors pass through a pipe 50 connected to the top of the condenser 51 and in the pipe 50 is a constant pressure valve 52 which will allow the vapors to pass into the condenser 51 at atmospheric pressure. The condenser may be of any appropriate construction; it can have a header at the top and bottom connected by a tube, the top header being connected by an inlet water pipe 53 and the bottom header by a discharge water pipe 54 or vice versa, so that the water will flow through the condenser and cool the incoming vapors received from the pipe 50. The condensed vapors within the condenser 51 will discharge through pipe 55, as will also some non-condensible gases, the latter being adapted to pass up through the pipe 56 and be drawn into the pipe 57 through the medium of the pump 58 where the non-condensed vapors or gases may be fed back into the lower headers of the primary furnaces. The liquefied vapors, however, will pass from pipe 55 into a measuring tank 59 and through a meter 60 into a storage tank 61.

After the plant has been started, the oil will be supplied from the supply tank 32 through the pump 33 through the first preheater 27, through the second preheater 38, through pipe 39 into the dephlegmator, overflowing into pipe 45 and into the secondary digester 2, through pipe 5 and through pipe 5' directly into the lower header of the heater 6, or it may flow into the lower header of the heater 7 or into both heaters together.

After the oil is heated it will pass up through the upper headers of the heaters 6 and 7, the circulating pump 23 inducing it to flow into the quiescent zone or primary digester 1 where its velocity will be retarded and time enough given to it to undergo a transition of the oil into vapor or to give up the lighter ends to be subsequently converted into gasoline.

The screen 41 may consist of one or a plurality of foraminous, reticulated or other perforate layers, the screens being of progressively decreasing mesh from the bottom toward the top layers so that in the event that the suspended carbon and other extraneous matter is introduced into the digester 1 with the vapors or oil from the pipe 24, the meshes of the screen will arrest them. Therefore, the oil which overflows through the screen through pipe 3 into the secondary digester 2 will have the carbon removed before it enters the digester 2 and for that reason it will not be necessary to have any screen in the digester 2.

The supply of liquid will not be diminished because there will be fresh oil coming into the dephlegmator all the time and its overflow will find its way into the digester 2 through the medium of the pipe 45 and from the digester 2 to the primary heaters 6 and 7.

In order to remove the carbon from the primary digester 1 without disturbing the operation of the system in any way, I have provided a scraper 62, which has a hanger 63 traveling on a guide rail 64 extending from end to end of the digester 1. The scraper consists of a blade pivoted to the hanger at 65 and having a bail 66 to which one end of the conveyor chain 67 is connected, the other end of the chain being connected to the hanger 63. The chain passes around an idler sprocket 68 and around a power sprocket 69. The sprocket 69 is on a shaft 70, carrying a beveled gear 71 with which meshes a beveled gear 72 on a shaft 73, passing through the stuffing box 74 and driven by an electric motor 75. The electric motor can be a reversing motor which will reverse after it has made a certain number of turns. Such reversing mechanism is very common on the market and can be readily supplied by numerous electrical manufacturers. Such devices work so that when there is a certain rotative movement of the motor shaft, the motor will reverse. Therefore, it is calculated to provide means so that the scraper can move longitudinally for a certain distance, enough to discharge the carbon to the sump, and then retrace its movement and since the pull on the bail 66 by the chain will be in a rearward direction during the retractive movement, the blade 62 will swing away from the bottom of the tank. It will only work against the bottom of the tank or digester 1 when it is moving toward the sump, in which position it will be scraping the carbon into the sump.

Whenever the sump is full it is obvious that the carbon, which is in a semi-liquid state, along with the tar and asphaltum, may be blown through the pipe 26 when the valve 28 is cracked, as above described. The hand wheel 29 is preferably really a fly wheel which can be swung around in one direction to crack the valve and then quickly swung around in the other direction to close the valve.

If it is desired to have a continuous discharge from the sump I may make use of the by-pass pipe 76, which by-passes the valve 23 and which, in itself, is provided with a valve 77 which may be slightly cracked to allow a continuous movement of deposited matter from the sump 25 into the pre-heater 27.

It is highly important that the carbon be removed at just the point shown; that is, it is important that means is provided for removal of the carbon from the primary digester or vapor zone because if means is not provided for removing the carbon at that particular point, there will be a settling of carbon in the digester 1, the result being that the plant must be shut down from time to time to clean the digester or tank 1 which impairs vitally one of the most important points of the invention; that is, to provide a continuous operation and as is well appreciated by those skilled in the art, the great difficulty with existing plants is the lack of ability to continue the operations over relatively long periods because if the plant has to be shut down for one-half of the time for inspection, cleaning or repairs, it is obvious that the plant is only 50% as efficient as it would be if it could be run continuously. There is not only a loss of time when a plant is shut down but a great loss of fuel required to bring the plant back to operating temperatures.

These difficulties are not present in my invention because I can close off one primary heater 6 or 7 by closing off the valves, say 17 and 22 for the heater 6 or the valves 18 and 21 for the heater 20, and the other heater can operate independently and the plant can be kept in operation.

If it becomes necessary, however, to close off both heaters, there will not be such a great loss in time and consumption of fuel because the tanks or digesters 1 and 2 are of great capacity and they are, therefore, adapted to retain the oil in a hot state for a very long time, particularly is this true since both digesters are heavily insulated to prevent the escape of heat.

It is also important to note that the tanks 1 and 2 together have twice the capacity of one tank and twice the length of time is provided for vaporizing the lighter ends. Therefore, the most efficient vaporization will take place.

Of course, the oil is initially heated in the heaters 6 and 7 but it is discharged at such a rapid rate from said heaters that it does not have the necessary time to crack or disintegrate until it reaches the primary digester 1. It will there give up most of the lighter end vapors but in the event that there is not time enough for these to disassociate themselves from the heavier ends, the oil overflowing through pipe 3 into the secondary digester 2 will finally give up at least most of the lighter ends which may flow back through pipe 42 into the dephlegmator and combine with those passing through pipe 42' into the spider 44.

The heaters 6 and 7 may independently drain through the pipes 78 and 79 which communicate with the offtake pipe 80 and with the respective heaters. The pipes 78 and 79 have valves 81 and 82. Therefore, when it is desired to cut out one heater for inspection or repairs, its drain valve will be opened, its inlet valve will be closed and its discharge valve will be closed. For example, suppose it is desired to cut out heater 6. The valve 17 will be closed so that no supply of oil may enter the lower heater 8. The valve 22 will be closed because there will be no oil to pass into the digester 1. The valve 82 will be open so that all the oil may drain therefrom, the valves 18 and 21 may be opened so that the heater 7 may operate and, of course, in that event, the valve 81 will be closed because this valve controls the drain discharge from the heater 7.

Attention is called to the fact that after the system is initially charged by introducing oil into the digesters and the heaters are put into operation, there will be a circulation started in the system due to the thermo-siphon effect in the system, the pump 23 being merely an accelerating pump to assist the thermo-siphon effect in the system. As oil is generated into vapor and converted into gasoline, there will be a depletion of the supply originally furnished. This will be taken care of by the pump 33, which will draw oil from the tank 32, force it through the heaters 27 and 38 by means of the pipes 35 and 36, and cause it to enter the dephlegmator through the pipe 39. The pump 33 will be operated at a rate sufficient to maintain a uniform supply commensurate with the drawn-off gasoline from the pipe 55 to make up for the drawn-off residues which are discharged through pipe 26.

It is desired to main a constant temperature of the oil within the heaters and the digesters 1 and 2. This temperature will approximate 750 degrees F., and it is desired to maintain the pressure at about 100 pounds to the square inch throughout the system except within the condenser, this being recommended as giving the best results. Of course, there will be a drop of temperature in the dephlegmator due to the fact that the incoming oil will be appreciably lower in temperature than the vapors and it is estimated that this temperature will approximate 400 degrees F. The vapors leave the digesters 1 and 2 at about 700 degrees F. If they were introduced directly into the condenser, one of the objects of the present invention would be defeated but instead they are passed into the dephlegmator into which oil at a very much lower temperature than the vapors has been introduced. The vapors pass through the oil in the dephlegmator, percolating or bubbling up from the bottom as above explained. Therefore, the vapors give up some of their heat to the body of oil so that the temperature of the vapors is reduced to about 400 degrees F., and it is the vapors at this temperature which are introduced into the condenser.

It will, therefore, be apparent that in passing the high temperature vapors through the lower temperature oil in the dephlegmator only those volatile ends which will boil up to 400 degrees F., can go into the condenser. As a matter of fact, even these will come in contact with the plates in the vapor chamber above the body of oil while they are passing through the dephlegmator and, therefore, their temperatures will be further reduced so that actually the volatile ends passing into the condenser past the reducing valve 52 will be slightly less than 400 degrees F., say about 375 degrees F.

As a result of this treatment, only those vapors of the lighter ends will be driven off, the heavier ends being condensed within the dephlegmator and returned, to be run back to the digester 2 and thence to the heaters 6 and 7.

Of course, it is to be understood that by arranging the reducing valve 52, the pressures of the vapors passing into the condenser can be controlled. The reducing valve will cause the vapors to enter the condenser at approximately atmospheric pressure, the condensate passing off through the pipe 55 and the fixed gases returned to the system through the pipe 57.

According to my plan then, the formula may be stated as heat plus pressure plus volume equals percent of recovery. The generally accepted theory is heat plus pressure equals percent but I find that I obtain very high efficiency by maintaining the oil in the system at a substantially constant pressure and at a substantially constant temperature throughout and that by continuously introducing oil in proportion to the amount of yield and the discharged precipitated carbon, the volume is maintained constant. The low temperature oils not only serve as a replenishing medium but they also constitute a heat exchanging medium whereby the vapors of the relatively high boiling point will be reabsorbed back into the system before they can enter the condenser, the obvious result being a yield of hydrocarbon (gasoline) of relatively low boiling point.

There is a special advantage in arranging the digesters 1 and 2 above the heaters so that the oil will enter the digester 1, and be absorbed by the large body of oil so that there will be no violent agitation. The importance of this is that the carbon may settle out in the digester 1 because, obviously, the less agitation in the digester, the more efficient will be the settling out of the carbon. The settling out, however, may be materially assisted by the screens in the digester 1.

I estimate that the oil will pass through the tubes in the heaters 6 and 7 at from 16 to 20 feet per minute. I do not wish to state this as a positive speed, however, because the speed may be whatever is necessary to prevent coking within the tubes and obviously, the faster the oil travels through the tubes, the less liability there will be of coking. However, it is important that after the oil has been raised to the decomposing temperature it should enter the digester 1 and remain there long enough to permit the necessary disintegration to allow the giving up of the vapors to be subsequently converted into gasoline.

It should be remembered that the oil is quickly transferred from the heaters to the digesters 1 and 2 and it is introduced into the digesters in a liquid state where it disintegrates and vaporizes, passing into the dephlegmator where the lighter ends separate from the heavier and pass into the condenser.

Attention is called to the fact that I may take advantage of conservation of heat by utilizing any available heat in the system for raising the temperature of the incoming oil and for that reason I prefer to run the oil through the preheaters 27 and 38.

Another important feature is that I arrange the digesters so that their capacities are great enough to hold large bodies of oil. It is, therefore, possible to cut out the heaters, make the necessary repairs, and cut them back into the line without any appreciable loss of heat in the major bodies of oil. The importance of this will be thoroughly appreciated when it is considered that it requires about twelve hours to raise the temperature of the oil from its original temperature to the decomposing temperature whereas with my invention the major portion of the heat is conserved in the digester while the repairs are taking place, it being understood, of course, that the digesters are thoroughly insulated with lagging or suitable covering.

It is important that the system be a closed system so that the oil can be continuously circulated through it. The only fresh oil which is introduced into the system is that which is required to keep the volumes in the digesters and heaters constant.

It is further of prime importance that the carbon be removed in the first digester 1 and if necessary from the second digester 2. There are peculiar conditions existent in the digesters 1 and 2 differentiating my invention materially from other known constructions. That is, the carbon is deposited in the first digester in a semi-liquid or semi-plastic condition and it gravitates to the bottom of the digester where there is no local application of heat. Therefore, the carbon can be easily scraped off the bottom of the digester and forced into the pit. If the carbon is deposited in a digester in which exterior heat is applied or where there is a local application of heat to the shell, the heat causes the carbon to become baked on the inside of the digester and because the steel of the digester has an affinity for carbon, it adheres so intimately that it can be removed only with great difficulty. Ordinarily scrapers are not able to take off the carbon so that the carbon deposits build up while the scrapers ride over them, the result being that the scrapers in practice do not perform the functions for which they are intended.

By depositing the carbon in the digesters to which no heat is applied, this baking will not take place so that the scrapers can remove the carbon in its semi-liquid or semi-plastic condition.

Attention is also called to the fact that the screen in the first digester prevents ebullition of the oil and, therefore, causes a more efficient distillation than is possible where the oil is in a constant state of agitation. It may be well to state here that it is desirable to move the scraper very slowly through the digester so that the liquid will not be unduly agitated or stirred, which would have a tendency to maintain the carbon in suspension. It is desired to have the liquid in the digester 1 as quiet as possible so that the maximum evaporation may take place and so that practically all of the carbon will be deposited in the bottom of the digester 1. Of course, the screen will tend to screen out the carbon in the liquid which would overflow from the digester 1 to digester 2 so it is estimated that very little, if any, carbon can get into the digester 2.

If I find it desirable, however, I may place a carbon remover in the digester 2 although ordinarily I believe it will not be necessary.

It will be apparent that the organization is quite complete, that it is a truly continuous process and that a high degree of efficiency can be obtained due to the long time element allowed for the disintegration of the oil after it has been heated up to high temperature. The accessibility of the parts and the ease of operation are also of prime importance in an invention of this character and these attributes are possessed in the organization shown and heretofore described.

What I claim and desire to secure by Letters-Patent is:

1. An apparatus for converting hydrocarbon oil of high boiling point into hydrocarbon oil of lower boiling point, comprising a furnace, heating means including vertically disposed oil conducting pipes in said furnace, an elongated, longitudinally disposed, insulated digester located outside the furnace, a connecting pipe leading from the heating means to one end of the digester, the digester being of sufficient capacity and length to dissipate the velocity of the stream of oil from the connecting pipe when it enters the digester and to allow sufficient time for disintegration of the oil so that the lighter ends will pass off from the heavier ends during the passage of the oil through the digester and carbon be deposited, a dephlegmator, means for discharging vapor from a portion of the digester distant from its inlet end into said dephlegmator, a second elongated, insulated horizontal digester of the same capacity and length as the first digester, a pipe communicating the first and second digesters to permit unvaporized oil to pass from the first digester into the second digester wherein the temperature of the oil remains substantially undiminished, means for feeding fresh oil into the base of the dephlegmator to collect in a pool therein, means for permitting fresh oil and condensates to overflow from said pool into the second digester, a vapor discharge pipe leading from the second digester to the dephlegmator, means for returning unvaporized oil from the second digester to the heating means, means for maintaining super-atmospheric pressure on the oil, and means for accelerating the flow of oil through the heating means.

2. An apparatus for converting hydrocarbon oil of high boiling point into hydrocarbon oil of lower boiling point comprising a furnace, heating means including vertically disposed oil conducting pipes in said furnace, an elongated, horizontally disposed, insulated digester located outside the furnace, a connecting pipe leading from the heating means to one end of the digester, the digester being of sufficient capacity and length to dissipate the velocity of the stream of oil from the connecting pipe when it enters the digester and to allow sufficient time for disintegration of the oil so that the lighter ends will pass off from the heavier ends during the passage of the oil through the digester and carbon be deposited along the bottom of the digester, means for removing carbon from the digester, a dephlegmator connected to a portion of the digester distant from its inlet end, a condenser connected to the dephlegmator, a second elongated, horizontally disposed, insulated digester of like capacity and length as the first digester, a pipe communicating the first and second digesters to permit the unvaporized oil to pass from the first digester into the second digester wherein the temperature of the oil remains substantially undiminished, means for feeding fresh oil into the base of the dephlegmator to collect in a pool therein, means for permitting fresh oil and condensates to overflow said pool into the second digester, a vapor discharge pipe leading from the second digester to the dephlegmator, means for returning unvaporized oil from the second digester to the heating means, means for maintaining super-atmospheric vapor pressure in the heating means, digesters and dephlegmator, and means for accelerating the flow of oil through the heating means.

3. An apparatus for converting hydrocarbon oil of high boiling point into hydrocarbon oil of lower boiling point comprising a furnace, heating means including vertically disposed oil conducting pipes in said furnace, an elongated, longitudinally disposed, insulated digester located outside the furnace, a connecting pipe leading from the heating means to one end of the digester, means for passing the oil through and from the heating means at relatively high velocity so as to reduce the liability of coking of the oil in the heating means and so that the oil will be discharged into the digester uncracked but at cracking temperature, the digester being of sufficient capacity and length to dissipate the velocity of the stream of oil from the connecting pipe where it enters the digester and to allow sufficient time for disintegration of the oil so that the lighter ends will pass off from the heavier ends during the passage of the oil through the digester and carbon be deposited therein, a dephlegmator, vapor conducting means connecting the dephlegmator to a portion of the digester distant from its inlet end, a second elongated, longitudinally disposed, insulated digester of the same capacity and length as the first digester, a pipe communicating the first and second digesters to permit the unvaporized oil to pass from the first digester into the second digester wherein the temperature of the oil remains substantially undiminished, an intermittently operating blow-off mechanism associated with the first digester, a preheater receiving its heat from the material passing through the blow-off, means for feeding fresh oil through said preheater and then into the base of the dephlegmator to collect in a pool therein, a vapor discharge pipe leading from the second digester to the dephlegmator, means for causing the vapors from both digesters to bubble through the pool of oil in the dephlegmator, means permitting the fresh oil and condensates to overflow from said pool into the second digester, means for returning unvaporized oil from the second digester to the heating means, and means for maintaining super-atmospheric pressure throughout the system except in the condenser.

4. An apparatus for converting hydrocarbon oil of high boiling point into hydrocarbon oil of lower boiling point comprising a furnace, heating means including vertically disposed oil conducting pipes in said furnace, an elongated, longitudinally disposed, insulated digester located outside the furnace, a connecting pipe leading from the heating means to one end of the digester, means for passing the oil through and from the heating means at relatively high velocity so as to reduce the liability of coking of the oil in the heating means and so that the oil will be discharged into the digester uncracked but at cracking temperature, the digester being of sufficient capacity and length to dissipate the velocity of the stream of oil from the connecting pipe where it enters the digester and to allow sufficient time for disintegration of the oil so that the lighter ends will pass off from the heavier ends during the passage of the oil through the digester and carbon be deposited therein, a dephlegmator, vapor conducting means connecting the dephlegmator to a portion of the digester distant from its inlet end, a second elongated, longitudinally disposed, insulated digester of the same capacity and length as the first digester, a pipe communicating the first and second digesters to permit the unvaporized oil to pass from the first digester into the second digester wherein the temperature of the oil remains substantially undiminished, an intermittently operating blow-off mechanism associated with the first digester, a preheater receiving its heat from the products of combustion passing from the furnace, means for feeding fresh oil through said preheater and then into the base of the dephlegmator to collect in a pool therein, a vapor discharge pipe leading from the second digester to the dephlegmator, means for causing the vapors from both digesters to bubble through the pool of oil in the dephlegmator, means permitting the fresh oil and condensates to overflow from said pool into the second digester, means for returning unvaporized oil from the second digester to the heating means, and means for maintaining super-atmospheric pressure throughout the system except in the condenser.

In testimony whereof I affix my signature.

WILLIAM F. MUEHL.